(12) United States Patent
Michioka et al.

(10) Patent No.: US 7,649,290 B2
(45) Date of Patent: Jan. 19, 2010

(54) BEARING BUSH AND COMPOUND MOVEMENT USING THE SAME

(75) Inventors: Hidekazu Michioka, Tokyo (JP); Katsuya Iida, Yamanashi (JP); Takashi Matsumoto, Yamanashi (JP); Masayuki Ishizaka, Yamanashi (JP)

(73) Assignee: THK Co., Ltd., Tokyo (JP)

( * ) Notice: Subject to any disclaimer, the term of this patent is extended or adjusted under 35 U.S.C. 154(b) by 172 days.

(21) Appl. No.: 11/587,144

(22) PCT Filed: Apr. 20, 2005

(86) PCT No.: PCT/JP2005/007534

§ 371 (c)(1),
(2), (4) Date: Nov. 16, 2007

(87) PCT Pub. No.: WO2005/103516

PCT Pub. Date: Nov. 3, 2005

(65) Prior Publication Data

US 2008/0159667 A1 Jul. 3, 2008

(30) Foreign Application Priority Data

Apr. 22, 2004 (JP) .............................. 2004-127136

(51) Int. Cl.
*H02K 5/16* (2006.01)
(52) U.S. Cl. .......................................... 310/90; 310/80
(58) Field of Classification Search ............. 310/12–15, 310/80, 90; 387/7, 13; 384/7, 13
See application file for complete search history.

(56) References Cited

U.S. PATENT DOCUMENTS 4,086,753 A * 5/1978 Tsuchiya et al. ............ 368/156

5,554,899 A * 9/1996 Teramachi ................... 310/80

FOREIGN PATENT DOCUMENTS

JP 58-94630 A 6/1983

(Continued)

OTHER PUBLICATIONS

International Search Report of PCT/JP2005/007534 date of mailing Aug. 16, 2005.

*Primary Examiner*—Dang D Le
(74) *Attorney, Agent, or Firm*—Westerman, Hattori, Daniels & Adrian, LLP

(57) ABSTRACT

Provided is a bearing bush enabling excellent advancing and retreating movements of a shaft member by eliminating a clearance between the bearing bush and the shaft member to eliminate a backlash therebetween, capable of reducing a load of dimension control on both the bearing bush and the shaft member, and capable of being manufactured at a low cost. The bearing bush (4) for supporting the reciprocating movement of the shaft member (1) in an axial direction has a receiving hole through which the shaft member (1) is passed. Grooves (40) are sequentially formed at predetermined intervals in an inner peripheral surface of the bearing bush (4) facing the receiving hole. An inner diameter of the receiving hole is formed to be equal to or smaller than an outer diameter of the shaft member (1), and the bearing bush is press-fitted to an outer peripheral surface of the shaft member (1) in a state of a so-called interference fit.

7 Claims, 5 Drawing Sheets

FOREIGN PATENT DOCUMENTS

| | | |
|---|---|---|
| JP | 2-9328 U | 1/1990 |
| JP | 9328-1990 U | 1/1990 |
| JP | 7-293559 A | 11/1995 |
| JP | 9-96331 A | 4/1997 |
| JP | 2001-12472 A | 1/2001 |
| JP | 2002-27732 A | 1/2002 |
| JP | 2002-307368 A | 10/2002 |

* cited by examiner

BEARING BUSH AND COMPOUND MOVEMENT USING THE SAME

TECHNICAL FIELD

The present invention relates to a bearing bush for supporting axial advancing and retreating movements of a shaft member, such as a spline shaft. For example, the present invention relates to a bearing bush used to support advancing and retreating movements of a spline shaft of a compound movement device having the spline shaft as the main shaft and capable of imparting a rotating motion to the spline shaft while causing the spline shaft to advance and retreat.

BACKGROUND ART

A main shaft of an automatic work supply device or of an automatic tool replacing device in an NC machine tool is required to be capable of making a rotational movement with high accuracy while freely advancing or retreating in the axial direction. In this connection, a combination of a spline shaft and a spline nut is used as means for supporting an axial movement of the main shaft and transmitting rotational torque to the main shaft.

In particular, in a ball spline, in which a spline nut is assembled to a spline shaft through the intermediation of a large number of balls, preload is imparted to the balls, whereby, when transmission of the rotational torque is effected between the spline nut and the spline shaft, no backlash is generated between the two components, making it possible to cause the spline shaft to advance and retreat smoothly while transmitting the rotational torque thereto.

A known conventional example of a compound movement device using such the ball spline is composed of a spline shaft having a plurality of ball rolling grooves extending in the axial direction, a spline nut assembled to this spline shaft through the intermediation of a large number of balls and capable of reciprocating in the axial direction, a substantially cylindrical housing which accommodates the spline nut and through which the spline shaft passes, and a rotation transmitting member, such as a pulley or a gear, mounted to the housing.

In providing the rotation transmitting member on the housing, if the rotation transmitting member is superimposed on the spline nut, the outer diameter of the rotation transmitting member becomes rather large, resulting in an increase in the device size and an increase in cost. In view of this, there is employed, as the housing, a stepped cylindrical member in which a large diameter portion and a small diameter portion are continuous with each other, with the large diameter portion being used as an accommodating portion for the spline nut, and the small diameter portion being used as a mounting portion for the rotation transmitting member.

On the other hand, when such the stepped cylindrical member is used as the housing and the spline nut and the rotation transmitting member are deviated from each other in the axial direction of the housing, a radial load applied to the housing from the rotation transmitting member (i.e., load perpendicular to the axial direction of the spline shaft) is allowed to act on the spline nut as a moment load, and if there is no support at all for the forward end of the small diameter portion of the housing with respect to the spline shaft, there is a disadvantage in that the housing will incline with respect to the spline shaft.

In view of this, a bearing bush formed of synthetic resin is arranged between the forward end of the small diameter portion of the housing and the spline shaft to thereby reduce the moment load acting on the spline nut. While this bearing bush is forced into the inner peripheral surface of the small diameter portion of the housing with pressure, to suppress an increase in the sliding resistance of the housing with respect to the spline shaft, the bearing bush is fitted onto the spline shaft in a state of a so-called clearance fit through the intermediation of a minute clearance (e.g., approximately 0 to 24 μm when the outer diameter of the spline shaft is 6 mm) with respect to the spline nut.

However, when the resin bearing bush fixed to the small diameter portion of the housing is thus fitted onto the spline shaft in a state of a clearance fit, due to the presence of a clearance, although extremely small, between the spline shaft and the bearing bush, the contact between the bearing bush and the spline shaft becomes rather unstable and the sliding resistance of the housing with respect to the spline shaft undergoes fluctuation or the like, so there arises a problem in that the precision in the axial advancing/retreating movement of the housing is likely to be impaired.

Further, strict control of the inner diameter dimension of the bearing bush and the outer diameter dimension of the spline shaft is required, which leads to an increase in production cost.

As disclosed in JP 2001-12472 A, in a known conventional guide device for a shaft member using a bearing bush formed of synthetic resin, the bearing bush and the shaft member are held in press contact with each other in a state of a so-called interference fit. In this guide device, the interference with which the two members are fit-engaged with each other is controlled by performing dimension control on the inner diameter of the bearing bush and the outer diameter of the shaft member, whereby the sliding resistance of the bearing bush with respect to the shaft member is kept within a predetermined range.

DISCLOSURE OF THE INVENTION

Problems to be Solved by the Invention

However, to completely eliminate the clearance between the bearing bush and the shaft member without involving an increase in sliding resistance, it is still necessary to perform strict dimension control on the inner diameter of the bearing bush and the outer diameter of the shaft member, thereby requiring a lot of time and effort for production.

The present invention has been made in view of the above-mentioned problems. Therefore, it is an object of the present invention to provide a bearing bush in which the clearance between the bearing bush and the shaft member is eliminated to thereby eliminate backlash therebetween, enabling the shaft member to perform advancing/retreating movements in a satisfactory manner, and in which the burden of dimension control for both the bearing bush and the shaft member is lessened, thus achieving a reduction in production cost.

Means for Solving the Problems

That is, according to the present invention, there is provided a bearing bush for supporting axial reciprocating movement of a shaft member, in which the bearing bush has a receiving hole through which the shaft member is passed, with grooves being sequentially formed at predetermined intervals in an inner peripheral surface facing the receiving hole. The inner peripheral surface of the bearing bush forms no clearance between itself and the shaft member, and is in press contact with the shaft member.

According to the present invention, grooves are formed sequentially at predetermined intervals in the inner peripheral surface of the bearing bush, so even if the bearing bush is fit-engaged with the shaft member by interference fit, the sliding contact surface of the bearing bush in press contact with the shaft member is crushed relatively easily, making it possible to reduce the press contact force with respect to the shaft member. Further, it is also possible to reduce the contact area between the bearing bush and the shaft member.

Thus, it is possible to minimize the sliding resistance between the bearing bush and the shaft member while eliminating the clearance therebetween, making it possible to achieve enhancement in the accuracy of the advancing/retreating movements of the shaft member with respect to the bearing bush. Further, due to the formation of a plurality of grooves in the inner peripheral surface of the bearing bush, the sliding contact surface of the bearing bush in press contact with the shaft member is crushed and deformed relatively easily, so it is possible to minimize the sliding resistance of the bearing bush with respect to the shaft member without having to perform strict control on the inner diameter dimension of the bearing bush, also making it possible to produce the bearing bush at so much the lower cost.

The bearing bush used in the present invention may be formed of metal or synthetic resin. However, from the viewpoint of reducing the press contact force generated when fit-engaging the bearing bush and the spline shaft with each other in a state of an interference fit, synthetic resin is more preferable.

The bearing bush of the present invention can be used in the above-described compound movement device. In the compound movement device, the advancement/retreating of the spline shaft is supported by the large number of balls with which the spline nut is provided. When the spline shaft advances or retreats at high acceleration or deceleration, the vibration due to the rolling of the balls acts on the spline shaft. However, in the present invention, when the advancing/retreating movements of the spline shaft are supported by using the bearing bush, the bearing bush is in press contact with the spline shaft, so the attenuation effect with respect to the vibration of the spline shaft is improved. Thus, even when the spline shaft advances or retreats at high acceleration or deceleration, the requisite positioning time for the spline shaft tends to be shorter. As a result, it is possible to shorten the tact time of an operation using this compound movement device, thus making it possible to produce machines and apparatuses with satisfactory productivity.

Further, the bearing bush of the present invention can be used for supporting the advancing/retreating movements of an output rod of a linear motor actuator. A known example of a linear motor actuator is composed of a magnet rod on which a large number of magnetic poles are arranged and a coil member loosely fitted around the magnet rod and adapted to drive the magnet rod in the axial direction. When this magnet rod is used as the output rod, it is necessary to support the advancing and retreating movements of the magnet rod by a bearing member. When the bearing bush of the present invention is used as the bearing member, it is possible to eliminate the clearance between the bearing bush and the magnet rod and to minimize the sliding resistance between the two members, making it possible to enhance the accuracy of the advancing and retreating movements of the magnet rod with respect to the bearing bush.

DESCRIPTION OF REFERENCE NUMERALS

1 . . . spline shaft, 2 . . . spline nut, 3 . . . housing, 4 . . . bearing bush, 40 . . . groove, 41 . . . protrusion

BEST MODE FOR CARRYING OUT THE INVENTION

In the following, a bearing bush according to the present invention will be described in detail with reference to the accompanying drawings.

Figure 1:
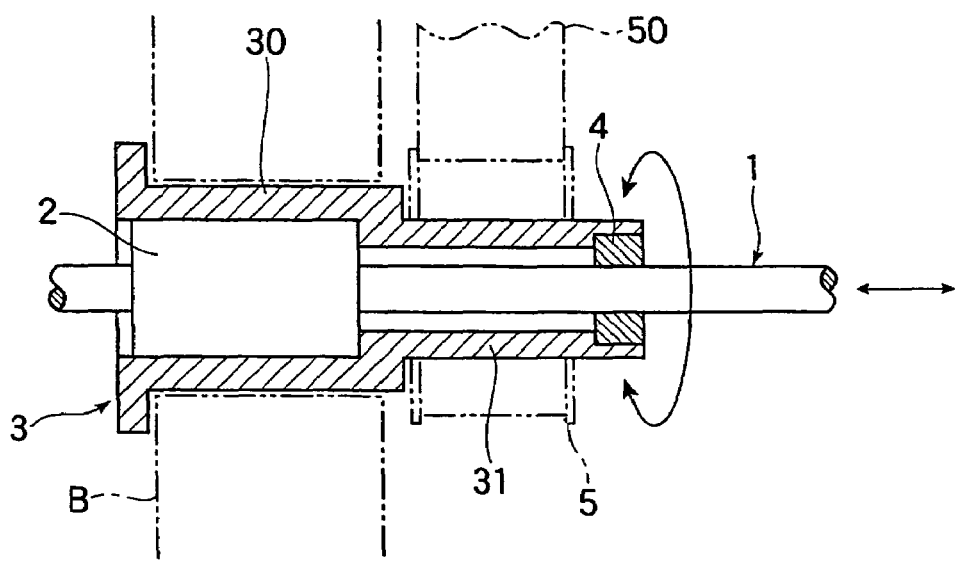
FIG. 1 A front sectional view of an embodiment of a compound movement device using a bearing bush according to the present invention.

FIG. 1 shows an example of a compound movement device supporting advancing and retreating movements of a spline shaft by using a bearing bush according to the present invention. This device is used as the main shaft of a tool replacement device or the like, and is composed of a spline shaft 1 used as the main shaft, a spline nut 2 capable of reciprocating in the axial direction of the spline shaft 1, a housing 3 for retaining the spline nut 2 and supported so as to be rotatable with respect to a stationary portion B, and a bearing bush 4 provided at one end of the housing 3, for guiding the advancing and retreating of the spline shaft 1 with respect to the housing 3.

The spline shaft 1 is caused to make axial advancing and retreating movements by a ball screw device, a hydraulic cylinder, a pneumatic cylinder, or the like (all of which are not shown), and the advancing and retreating movements are supported by the spline nut 2. Fixed to the housing 3 is a rotation transmitting member 5, such as a pulley or a gear, around which a timing belt is wrapped, rotational torque is imparted to the housing 3 from the outside, and this rotational torque is transmitted to the spline shaft 1 through the spline nut 2, making it possible to arbitrarily rotate the spline shaft 1.

Figure 2:
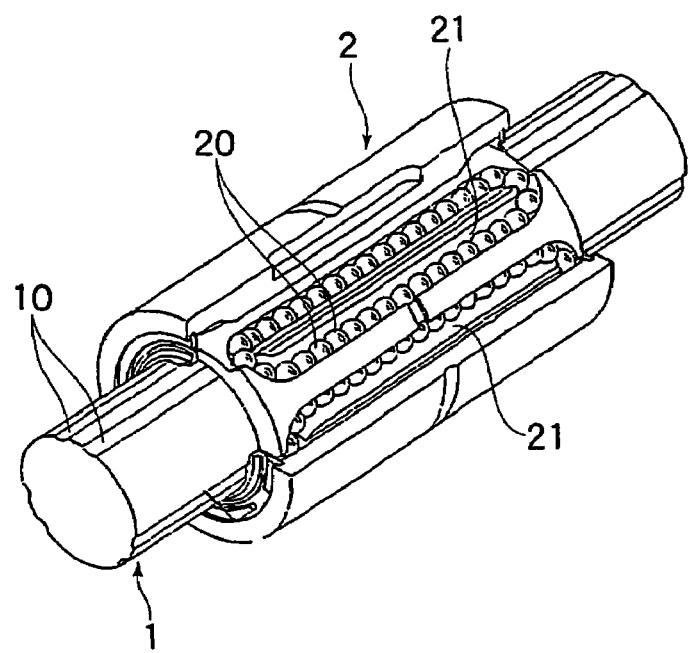
FIG. 2 A perspective view of an example of a ball spline that can be used in the compound movement device according to the present invention.

FIG. 2 shows an example of a ball spline in which the spline shaft 1 and the spline nut 2 are combined with each other. The spline shaft 1 has a substantially circular sectional configuration, and has on the outer peripheral surface thereof a plurality of ball rolling grooves 10 extending in the axial direction. The spline nut 2 has a substantially cylindrical configuration and has a through-hole through which the spline shaft 1 is passed. The spline nut 2 is assembled to the spline shaft 1 through the intermediation of a large number of balls 20 rolling in the ball rolling grooves 10 of the spline shaft 1. Further, the spline nut 2 is equipped with an endless circulation path 21 through which the balls 20 circulate, and can continuously move along the spline shaft 1 while circulating the balls 20 in the endless circulation path 21. Preload is imparted to the balls 20 rolling between the spline shaft 1 and the spline nut 2 while receiving a load, thereby eliminating backlash between the spline nut 2 and the spline shaft 1. Even when rotational torque is being transmitted to the spline shaft 1 from the spline nut 2, it is possible to cause the spline shaft 1 to advance and retreat in the axial direction smoothly and accurately.

The housing 3 is substantially formed as a cylinder covering the periphery of the spline shaft 1, and is equipped with a large diameter portion 30 accommodating the spline nut 2 and a small diameter portion 31 whose outer diameter is smaller than that of the large diameter portion 30, with the housing as a whole being formed as a stepped cylinder. A rotary bearing (not shown) is mounted to the outer peripheral surface of the large diameter portion 30, whereby the housing 3 is supported so as to be rotatable with respect to the stationary portion B. Further, the spline nut 2 is fit-engaged with the inner diameter side of the large diameter portion 30, and is fixed to the large diameter portion 30 by a bolt radially extending through the large diameter portion 30.

The small diameter portion 31 is formed to exhibit an outer diameter smaller than that of the large diameter portion 30, and a rotation transmitting member 5, such as a pulley, is fixed to the outer peripheral surface thereof. The inner diameter of the small diameter portion 31 is slightly larger than the outer diameter of the spline shaft 1, enabling the spline shaft 1 to freely advance and retreat in the axial direction within the small diameter portion 31.

Figure 3:
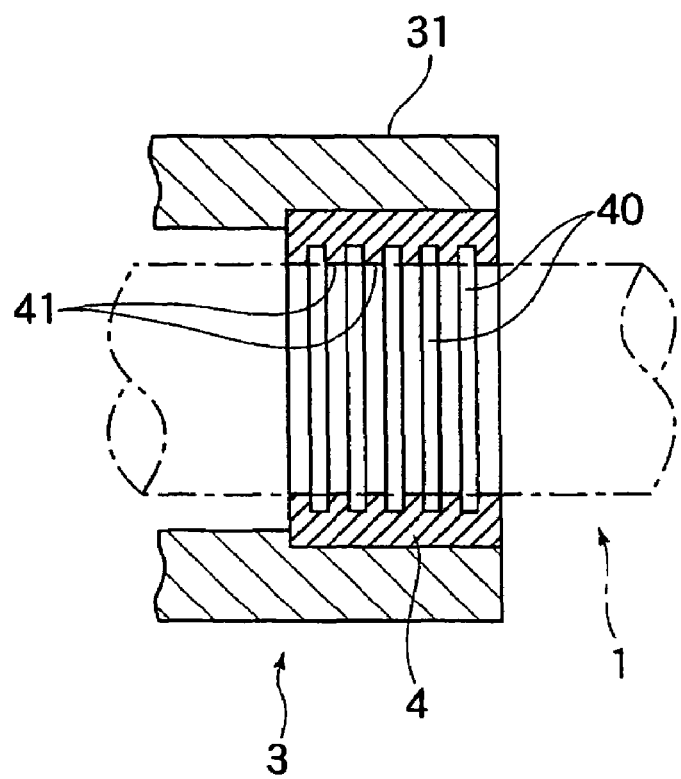
FIG. 3 An enlarged view showing how the bearing bush and a spline shaft are held in contact with each other.

The bearing bush 4 is mounted to one end of the small diameter portion 31 side of the housing 3, that is, to the forward end of the small diameter portion 31, guiding the advancing and retreating movements of the spline shaft 1 with respect to the housing 3. The bearing bush 4 is formed of a synthetic resin (e.g., polyacetal) which is superior in frictional wear resistance and is self-lubricant, and which is endowed with high elasticity modulus. As shown in FIG. 3, the bearing bush 4 is provided between the inner peripheral surface of the small diameter portion 31 of the housing 3 and the outer peripheral surface of the spline shaft 2. The bearing bush 4 has a substantially cylindrical configuration with a receiving hole through which the spline shaft 1 is passed, and is press-fitted into the inner peripheral surface of the small diameter portion 31 of the housing 3 and fixed in position therein. The inner diameter of the receiving hole is equal to or smaller than the outer diameter of the spline shaft 1, and the receiving hole is in press contact with the outer peripheral surface of the spline shaft 1 in a so-called interference fit state. In this interference fit, assuming, for example, that the interference is $\gamma$ and the shaft diameter is D, $\gamma$ is approximately equal to D/1000.

Figure 4:
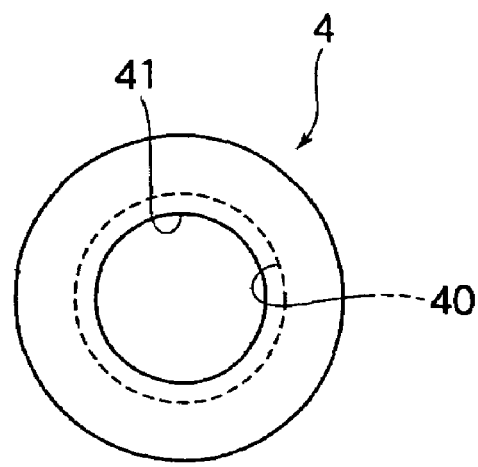
FIG. 4 A side view of the bearing bush.

As shown in FIGS. 3 and 4, a plurality of circumferential grooves 40 are formed at predetermined intervals in the inner peripheral surface of the bearing bush 4, with the portions of the inner peripheral surface other than the grooves 40 being defined as annular protrusions 41 whose distal ends are in press contact with the outer peripheral surface of the spline shaft 1. Thus, if the bearing bush 4 is fit-engaged with the spline shaft 1 in a state of interference fit, the distal ends of the protrusions 41 formed in the inner peripheral surface of the bearing bush 4 are crushed by the spline shaft 1 and easily undergo elastic deformation, thus reducing the press contact force between the bearing bush 4 and the spline shaft 2. As a result, even if the bearing bush 4 is fit-engaged with the spline shaft 1 in a state of interference fit, it is possible to reduce the sliding resistance exerted therebetween. Further, due to the formation of a plurality of grooves in the inner peripheral surface of the bearing bush 4, the contact area between the spline shaft 1 and the bearing bush 4 becomes smaller than that in the case in which no grooves 40 are formed, which also helps to reduce the sliding resistance between the bearing bush 4 and the spline shaft 1.

Further, with this construction, in which a plurality of circumferential grooves 40 are formed in the inner peripheral surface of the bearing bush 4 and in which a plurality of protrusions 41 between the grooves 40 are held in press contact with the outer peripheral surface of the spline shaft 1, the protrusions 41 repeatedly scrape the outer peripheral surface of the advancing and retreating spline shaft 1, so the bearing bush functions as a seal device, making it possible to prevent dust on the spline shaft 1 from entering the housing 3.

As stated above, the bearing bush 4 may be formed of a synthetic resin having a self-lubricant property. However, it is also possible to previously fill the grooves 40 with grease so that the grease in the grooves 40 may be applied to the outer peripheral surface of the spline shaft 1 as the spline shaft 1 advances and retreats. By thus filling the grooves of the bearing bush with grease, it is possible to further improve the function of the bearing bush as a seal device.

In the compound movement device constructed as described above, when rotational torque is transmitted to the pulley 5 fixed to the small diameter portion 31 of the housing 3 through, for example, a timing belt 50, it is possible to rotate the housing 3 rotatably supported with respect to the stationary portion B. Thus, it is possible to transmit rotational torque to the spline shaft 1 supported by the housing 3 through the intermediation of the spline nut 2, making it possible to arbitrarily rotate the spline shaft 1 around the axis thereof. Further, in the state in which the spline shaft 1 is thus being rotated, it is possible to arbitrarily cause the spline shaft 1 to advance and retreat in the axial direction.

Since the small diameter portion 31 of the housing 3 is provided with the bearing bush 4 for guiding the spline shaft 1, and the bearing shaft 4 is fit-engaged with the spline shaft 1 by interference fit, the clearance between the two members is eliminated, making it possible to smoothly guide the spline shaft 1 with constantly stable sliding resistance.

Further, while the spline shaft 1 and the bearing bush 4 are in press contact with each other by interference fit, due to the provision of a plurality of grooves 40 in the inner peripheral surface of the bearing bush 4, it is possible, as stated above, to reduce the press contact force between the spline shaft 1 and the bearing bush 4, and further, to reduce the contact area, so that it is also possible to minimize the sliding resistance of the spline shaft 1 with respect to the bearing bush 4.

Further, as a result of the provision of a plurality of grooves 40 in the inner peripheral surface of the bearing bush 4, the distal ends of the protrusions 41 in contact with the spline shaft 1 are crushed relatively easily and undergo deformation, so in fit-engaging the bearing bush 4 with the spline shaft 1 by interference fit, it is possible to minimize the sliding resistance of the bearing bush 4 with respect to the spline shaft 1 without having to perform a very strict control on the inner diameter dimension of the bearing bush 4. As a result, the requisite time and effort for dimension control in the production of the bearing bush 4 are reduced, making it possible to produce the device at so much the lower cost.

A bearing bush having an axial length of 3 mm, an outer diameter of 8 mm, and an inner diameter of 6 mm (tolerance:

0 to −0.010 mm) was actually fit-engaged with a spline shaft having an outer diameter of 6 mm (tolerance: 0 to −0.012 mm) to examine the backlash of the spline shaft with respect to the bearing bush and the increase in sliding resistance. Four grooves having a width of 0.75 mm and a depth of 0.4 to 0.7 mm were formed in the inner peripheral surface of the bearing bush. The examination result showed that there was no backlash of the spline shaft with respect to the bearing bush, and the spline shaft could be guided smoothly. As for the increase in sliding resistance, it was sufficiently allowable in terms of practical use.

While in the bearing bush 4 shown in FIG. 3, the grooves 40 have a rectangular sectional configuration and the protrusions 41 are also rectangular, from the viewpoint of making the distal ends of the protrusions 41 easier to deform elastically, it is desirable for the grooves 40 to be formed in a triangular sectional configuration and for the distal ends of the protrusions 41 to be formed in a steeple-like configuration.

While in the bearing bush 4 shown in FIGS. 3 and 4, a plurality of grooves 40 are formed in the inner peripheral surface thereof so as to be parallel to each other, it is also possible for the grooves 40 to be formed as a single or a plurality of continuous spiral grooves.

Figure 5:
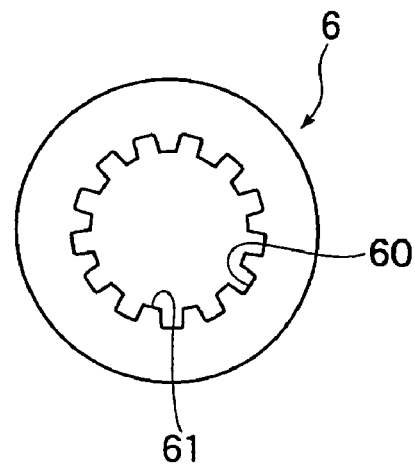
FIG. 5 A side view of another example of a bearing bush.

FIG. 5 shows another example of the bearing bush 4. While in the bearing bush 4 shown in FIGS. 3 and 4, circumferential grooves 40 are formed in the inner peripheral surface thereof, in a bearing bush 6 shown in FIG. 5, a plurality of axial grooves 60 are formed, and ridges 61 defined between these grooves are held in press contact with the outer peripheral surface of the spline shaft 1 by interference fit. With the bearing bush 6 also, the same effect as that of the above-described bearing bush 4 can be obtained.

Figure 6:
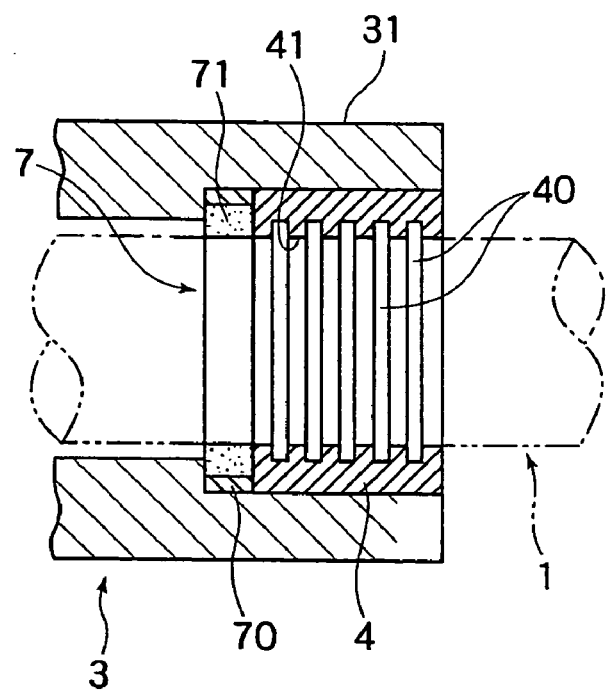
FIG. 6 An enlarged view of an example in which a lubricant supply member is provided adjacent to the bearing bush.

FIG. 6 shows an example in which a lubricant supply member 7 is provided inside the small diameter portion 31 of the housing 3. The supply member 7 is composed of a ring member 70 adjacent to the bearing bush 4 and fit-engaged with the inner peripheral surface of the small diameter portion 31 of the housing 3, and an application member 71 fixed to the inner peripheral surface of the ring member 70 and consisting of felt or the like impregnated with lubricant. The application member 71 is held in contact with the outer peripheral surface of the spline shaft 1, and when the spline shaft 1 advances or retreats, the application member 71 applies a requisite minimum amount of lubricant to the outer peripheral surface thereof. As stated above, the bearing bush 4 of the present invention also functions as a seal device for sealing the clearance between the small diameter portion 31 of the housing 3 and the spline shaft 1. Thus, when the lubricant supply member 7 is provided inside the small diameter portion 31 so as to be adjacent to the bearing bush 4, there is no fear of the lubricant applied to the spline shaft 1 flowing out. Further, the lubricant is applied to the outer peripheral surface of the spline shaft 1, from which fine dust has been scraped away by the bearing bush 4, so it is possible to achieve further improvement in terms of lubrication performance.

Figure 7:
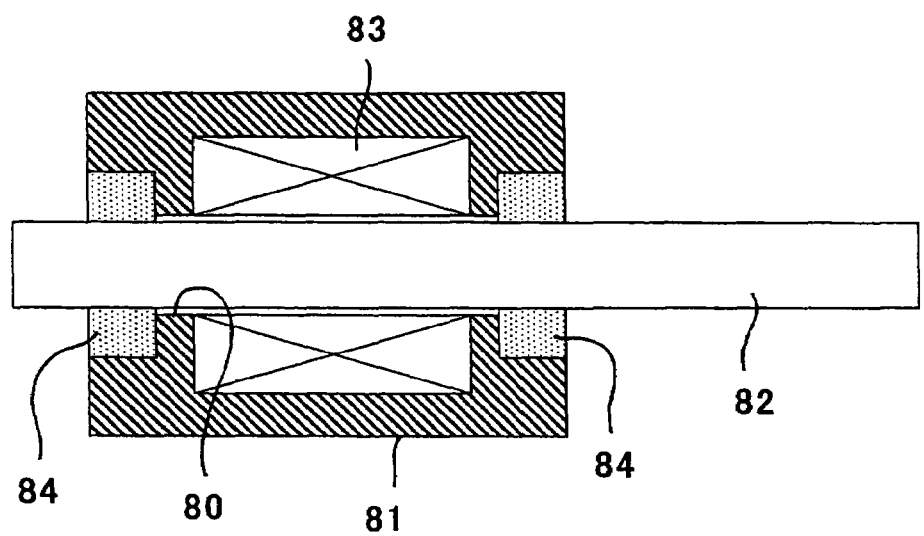
FIG. 7 A front sectional view of an embodiment of a linear motor actuator using the bearing bush according to the present invention.

FIG. 7 shows an example in which the bearing bush of the present invention is used to support the output rod of a linear motor actuator 8. The linear motor actuator 8 is composed of a housing 81 in which a through-hole 80 is formed, an output rod 82 which is provided so as to extend through the through-hole 81 and on which a large number of magnetic poles are arranged at a predetermined pitch in an axial direction, a coil member 83 which is loosely fitted onto the periphery of the output rod 82 and fixed to the housing 81, for driving the output rod 82 in the axial direction, and a pair of bearing members 84, 84 fixed to the housing 81 at the openings at the ends of the through-hole and supporting advancing and retreating movements of the output rod. This linear motor actuator can cause the output rod 82 to freely advance and retreat in the axial direction and to stop at an arbitrary position.

Figure 8:
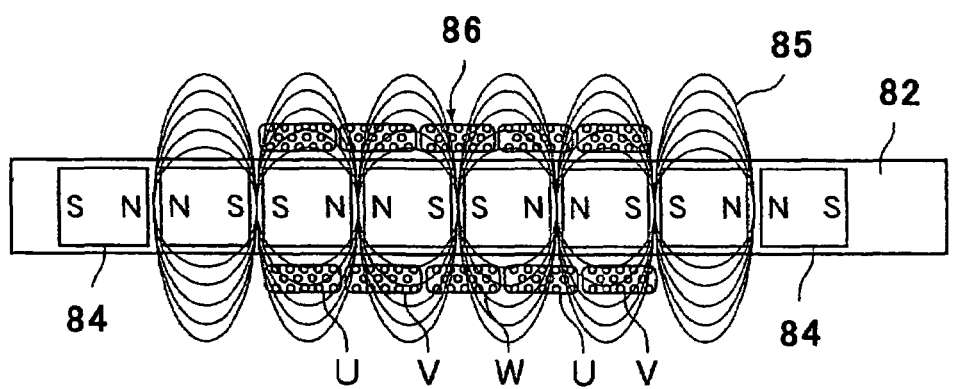
FIG. 8 A side view illustrating an operation principle of a linear motor according to an embodiment.

The output rod 82 and the coil member 83 constitute a linear motor, and the coil member 83 is loosely fitted onto the periphery of the output rod 82 with a slight gap therebetween. The output rod 82 is magnetized so as to exhibit a plurality of permanent magnets which are arranged in the axial direction, with the outer peripheral surface of the output rod being machined into a smooth surface. As shown in FIG. 8, each permanent magnet 84 has an N-pole and an S-pole, and the adjacent permanent magnets 84 are arranged with their orientations being alternately reversed so that the permanent magnets of the same polarity are opposed to each other. As a result, the output rod 82 has a magnetized portion for driving, in which the N-poles and the S-poles are alternately arranged in the longitudinal direction to form a field magnet.

Figure 9:
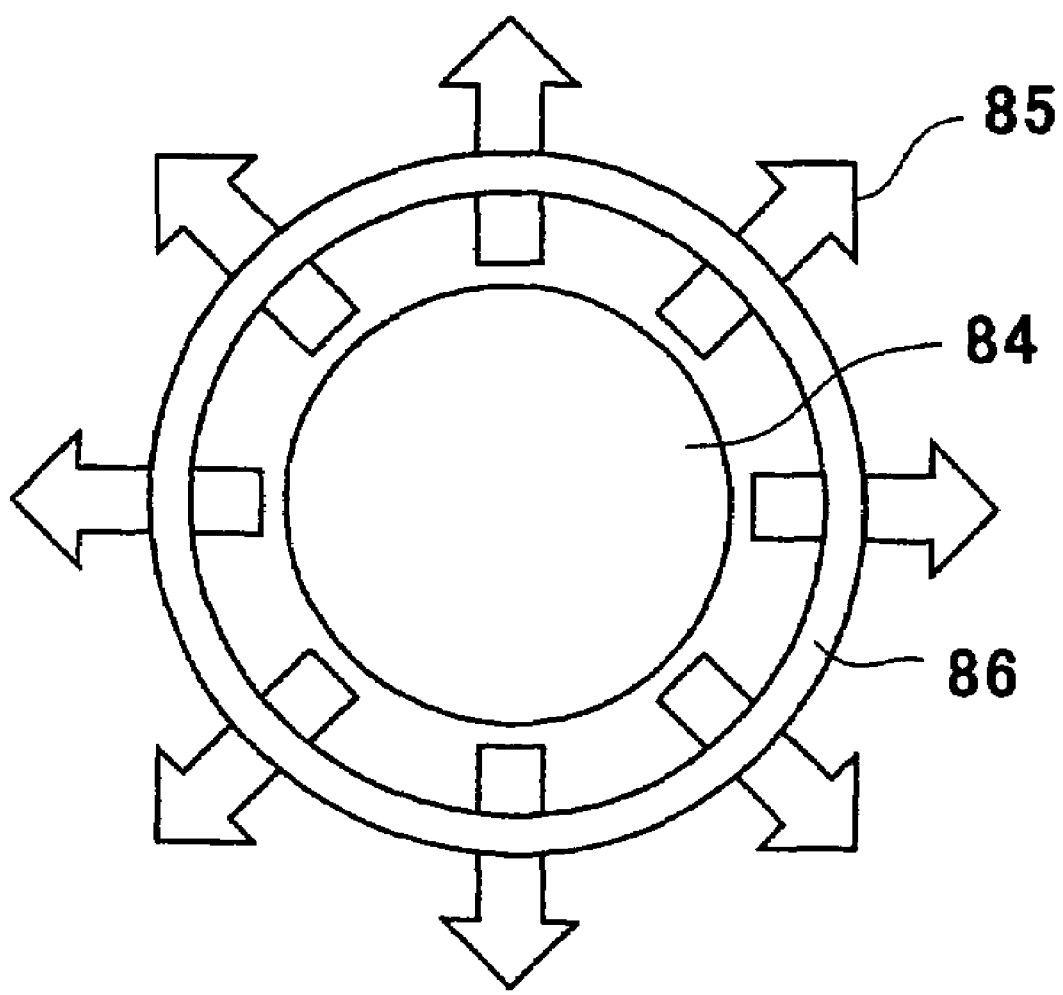
FIG. 9 A front view illustrating the operation principle of the linear motor according to the embodiment.

FIGS. 8 and 9 show the operation principle of this linear motor. The coil member 83 has a coil group in which three excitation coils 86 of U-, V-, and W-phase constitute one set. The excitation coils 86 of all the phases have a ring-like configuration, and are opposed to the outer peripheral surface of the output rod 82 with a slight gap therebetween. The arrangement pitch of the excitation coils 86 of the different phases is set to be smaller than the arrangement pitch of the permanent magnets 84. Magnetic fluxes 85 are formed on the output rod 82 from the S-poles toward the N-poles, and the coil member 83 contains a magnetic pole sensor (not shown) for detecting the magnetic flux density thereof. Thus, the positional relationship of the magnetic poles (i.e., N-poles and S-poles) of the output rod 82 with respect to the excitation coils 86 is grasped from a detection signal output from this magnetic pole sensor. A controller controlling the supply of electricity to the excitation coils 86 receives the detection signal from the magnetic pole sensor and calculates an optimum electric current corresponding to the positional relationship between the excitation coils 86 and the magnetic poles of the output rod 82, thereby supplying the electric current to the excitation coils 86. As a result, due to the interaction between the electric current flowing through the excitation coils 86 and the magnetic fluxes 85 formed by the permanent magnets 84, an attraction force and a repellent force are generated between the excitation coils 86 and the magnetic poles of the permanent magnets 84, and the output rod 82 is propelled in the axial direction with respect to the coil member 83 fixed to the housing 81.

A housing 61 containing the coil member is formed of aluminum, which is superior in heat conductivity. From the viewpoint of efficiently conducting to the housing 81 the heat generated in the excitation coils 86 when the excitation coils 86 are energized and radiating the heat into the ambient atmosphere, and from the viewpoint of effectively cooling the excitation coils 86 themselves, it is desirable to form a plurality of radiation fins on the surface of the housing 81.

As each of the pair of bearing members 84 supporting the output rod 82 with respect to the housing 81, the bearing bush of the present invention used in the compound movement device described above is applicable as it is.

That is, when the bearing bush 4 of the present invention shown in FIG. 4 is used as each of the bearing members 84, the bearing bushes 4 are fit-engaged with the output rod 82 by interference fit, so the gap therebetween is eliminated, making it possible to smoothly guide the output rod 82 with constantly stable sliding resistance.

Further, while the output rod 82 is held in press contact with the bearing bushes 4 by interference fit, due to the provision of a plurality of grooves 40 in the inner peripheral surfaces of the bearing bushes 4, the press contact force between the output rod 82 and the bearing bushes 4 is reduced as stated above. Further, since the contact area can be reduced, it is possible to minimize the sliding resistance of the output rod 82 with respect to the bearing bushes 4.

Further, as a result of the provision of a plurality of grooves 40 in the inner peripheral surfaces of the bearing bushes 4, the distal ends of the protrusions 41 in contact with the output rod 82 are crushed relatively easily and undergo deformation, so in fit-engaging the bearing bushes 4 with the output rod 82 by interference fit, it is possible to minimize the sliding resistance of the bearing bushes 4 with respect to the output rod 82 without having to perform a very strict control on the inner diameter dimension of the bearing bushes 4. As a result, the requisite time and effort for dimension control in the production of the bearing bushes 4 are reduced, making it possible to produce the linear motor actuator at so much the lower cost.

The invention claimed is:

1. A compound movement device, comprising:
   a spline shaft having a plurality of ball rolling grooves extending in an axial direction;
   a spline nut assembled to the spline shaft through an intermediation of a large number of balls and capable of reciprocating in the axial direction;
   a housing formed as a stepped cylindrical member having a large diameter portion and a small diameter portion that are continuous with each other, with the spline shaft extending through the large diameter portion and the small diameter portion, the large diameter portion being used as an accommodating portion for the spline nut, and an outer peripheral surface of the small diameter portion being used as a mounting surface for a rotation transmitting member; and
   a bearing member fixed to the small diameter portion of the housing, for supporting advancement and retreating of the spline shaft, and
   a bearing bush for supporting an axial reciprocating movement of a shaft member, said bearing bush has a receiving hole through which the shaft member is passed, and grooves are formed sequentially at predetermined intervals in an inner peripheral surface facing the receiving hole, with the inner peripheral surface being in press contact with the shaft member.

2. The bearing bush according to claim 1, characterized in that the grooves in the inner peripheral surface are formed circumferentially.

3. The bearing bush according to claim 1, characterized in that the grooves in the inner peripheral surface are formed spirally.

4. The bearing bush according to claim 1, characterized in that the bearing bush is formed of synthetic resin.

5. The compound movement device according to claim 1, characterized in that the bearing bush is forced into the small diameter portion of the housing.

6. The compound movement device according to claim 1, characterized in that the grooves in an inner peripheral surface of the bearing bush are filled with grease.

7. The compound movement device according to claim 1, characterized in that a lubricant supply member for applying lubricant to an outer peripheral surface of the spline shaft is provided inside the small diameter portion of the housing at a position on an inner side of the bearing bush so as to be adjacent to the bearing bush.

* * * * *